United States Patent
Lee

(10) Patent No.: US 7,536,685 B2
(45) Date of Patent: May 19, 2009

(54) METHOD OF UPDATING FIRMWARE

(75) Inventor: Ki-ju Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 442 days.

(21) Appl. No.: 10/440,250

(22) Filed: May 19, 2003

(65) Prior Publication Data

US 2004/0054995 A1     Mar. 18, 2004

(30) Foreign Application Priority Data

Sep. 14, 2002   (KR) ...................... 10-2002-0056010

(51) Int. Cl.
*G06F 9/445*     (2006.01)
(52) U.S. Cl. ...................... 717/173; 717/178
(58) Field of Classification Search ......... 717/168–178; 709/201–239
See application file for complete search history.

(56) References Cited

U.S. PATENT DOCUMENTS

| | | | |
|---|---|---|---|
| 6,021,276 A * | 2/2000 | Demke et al. | 717/178 |
| 6,047,127 A * | 4/2000 | McCarten et al. | 717/173 |
| 6,360,362 B1 | 3/2002 | Fichtner et al. | |
| 6,470,496 B1 * | 10/2002 | Kato et al. | 717/173 |
| 6,473,788 B1 * | 10/2002 | Kim et al. | 709/209 |
| 6,571,217 B1 * | 5/2003 | Anderson et al. | 705/14 |
| 6,614,804 B1 * | 9/2003 | McFadden et al. | 370/468 |
| 2002/0059362 A1 | 5/2002 | Maeda | |
| 2003/0195974 A1 * | 10/2003 | Ronning et al. | 709/230 |
| 2003/0208569 A1 * | 11/2003 | O'Brien et al. | 709/221 |

FOREIGN PATENT DOCUMENTS

| | | |
|---|---|---|
| CN | 1212560 | 3/1999 |
| CN | 1341239 | 3/2002 |

\* cited by examiner

*Primary Examiner*—Chuck O Kendall
(74) *Attorney, Agent, or Firm*—Staas & Halsey LLP

(57) ABSTRACT

A method of updating firmware for a product by downloading the updated firmware and automatically diagnosing download errors when processing customer requests to update the firmware. The method is provided by starting provision of the firmware file to a user device and receiving from the user device a first temporary file indicating a start of downloading the firmware file, and receiving from the user device a second temporary file completion or a failure of the download. It is determined whether the download of the firmware file is started and whether the download was a success or a failure by inspecting the received first and second temporary files and to rectify a problem that caused the failure of the download based upon the received second temporary file.

14 Claims, 2 Drawing Sheets

METHOD OF UPDATING FIRMWARE

CROSS-REFERENCE TO RELATED APPLICATIONS

This application claims the priority of Korean Patent Application No. 2002-56010, filed on Sep. 14, 2002, in the Korean Intellectual Property Office, the disclosure of which is incorporated herein in its entirety by reference.

BACKGROUND OF THE INVENTION

1. Field of the Invention

The present invention relates to a method of downloading information for an optical disc drive (ODD), and more particularly, to a method of updating firmware, which can automatically process requests from customers regarding the update of firmware and rapidly provide requested services to the customers.

2. Description of the Related Art

FIG. 1 is a flowchart of a conventional method of updating firmware. At operation 101, a customer visits a web site that provides firmware download services. At operation 102, the customer visiting the web site finds out information related to a product model for which the customer wishes to download firmware. After finding out the related information, at operation 102, the customer requests download of a firmware file for upgrading the corresponding desired product model. At operation 104, in response to the customer's request, the firmware file to be downloaded is opened and is extracted from a compressed format (i.e., decompressed), and then, at operation 105, the firmware file is downloaded into the customer's personal computer system. However, if any problem arises during the download of the firmware file, the download process is interrupted.

If the download process is interrupted, conventionally the web site (service provider) merely informs the customer of the failure of the download, and to know a cause of the interruption, the service provider of the web site additionally inquires about the cause of the interruption from the customer. However, because the problem that caused the interruption may not be repeated, and if the customer cannot provide an answer about the cause of the interruption, it may not be possible to know the problem that caused the interruption and it may be difficult to evaluate and correct the problem. Furthermore, it is difficult to provide the customer with a proper and quick service to rectify the problem.

SUMMARY OF THE INVENTION

The present invention provides a method of updating firmware, which quickly detects a cause of a problem during download of a firmware file and provides an adequate service to rectify the problem using temporary files produced when the download of the firmware file is started and ended.

Additional aspects, and advantages of the invention will be set forth in part in the description which follows and, in part, will be obvious from the description, or may be learned by practice of the invention.

The present invention provides a method of updating firmware in a system including a user device, a service provider device providing a firmware file to the user device through a communication network, and a web server providing the firmware file to the service provider device. The method comprises starting provision of the firmware file to the user device and receiving from the user device a first temporary file indicating a start of downloading of the firmware file; completing the provision of the firmware file to the user device and receiving from the user device a second temporary file informing of an end of or a failure of the download; and determining whether the download of the firmware file started and whether the download was a success or a failure by inspecting the received first and second temporary files, and if determined that the download failed, rectifying the failure of the download.

According to an aspect of the present invention, the first and the second temporary files are deleted after a predetermined time. Further, according to an aspect of the present invention, any failure in the download determined as a result of inspecting the received second temporary file, is determined to be caused by a functional error in the user device or an error in communication with the user device for a predetermined time.

BRIEF DESCRIPTION OF THE DRAWINGS

The above and/or other aspects and advantages of the present invention will become more apparent and more readily appreciated from the following description of the embodiments, taken in conjunction with the accompanying drawings in which.

DETAILED DESCRIPTION OF THE PREFERRED EMBODIMENTS

Figure 1:
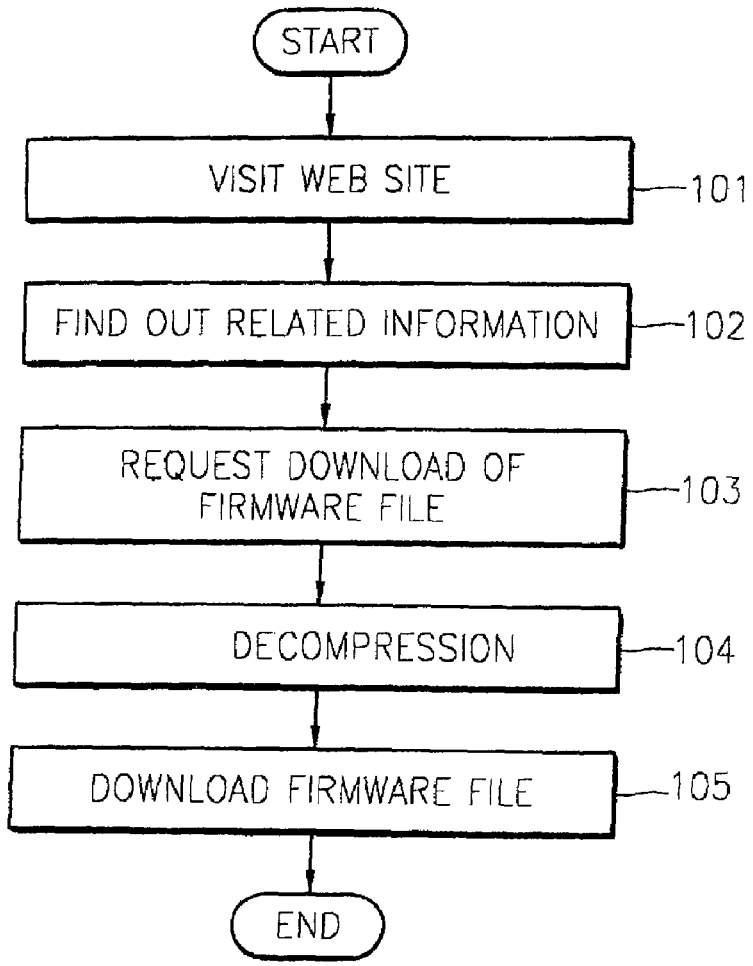
FIG. 1 is a flowchart of a conventional method of updating firmware.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
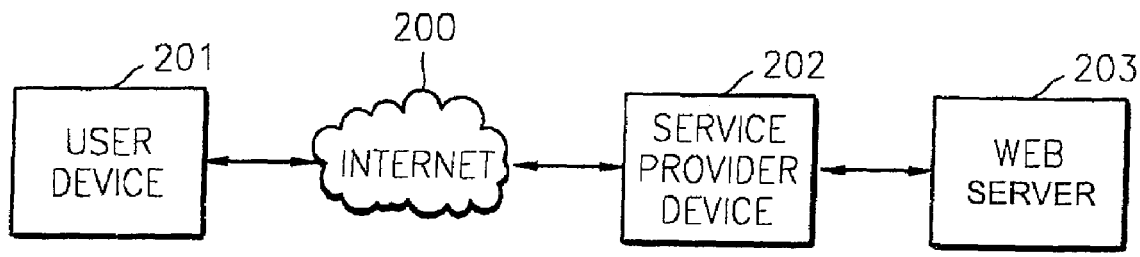
FIG. 2 is a block diagram of a system updating firmware, according to an embodiment of the present invention.
Figure 3:
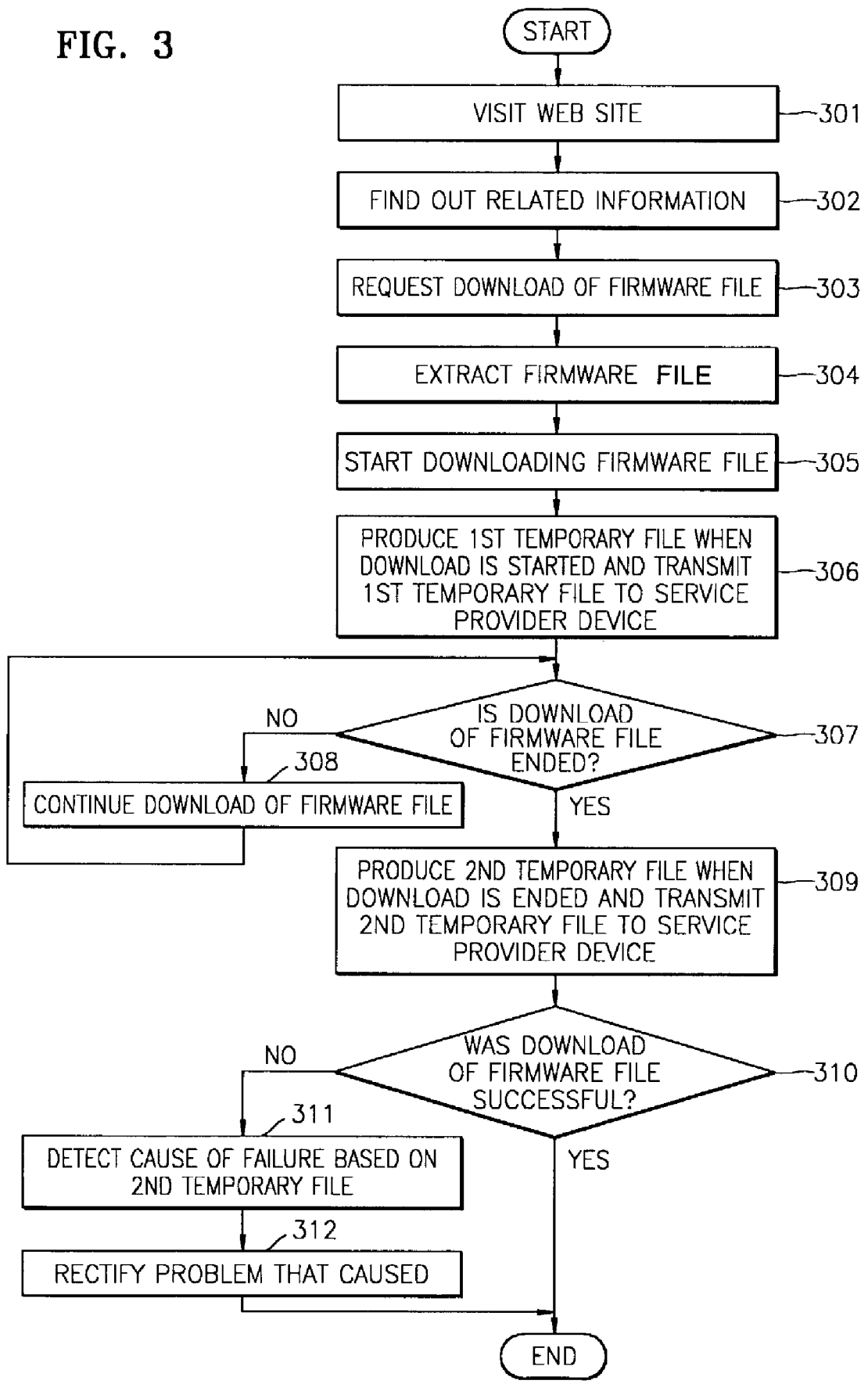
FIG. 3 is a flowchart of a method of updating firmware, according to an embodiment of the present invention.

Referring to FIG. 2, typically, a system updating firmware utilizes the Internet 200, and comprises a user device 201, a service provider device 202, and a web server 203. FIG. 3 is a flowchart of updating firmware in the example system shown in FIG. 2, according to an embodiment of the present invention.

In FIG. 3, a method of updating firmware comprises, at operation 301, visiting a web site, at operation 302, finding related information of a product desired to be updated, at operation 303, requesting download of a firmware file, at operation 304, extracting the firmware file from a compressed format, at operation 305, starting to download the extracted firmware file, at operation 306 producing a first temporary file at the instant that the download of the extracted firmware file is started and transmitting the first temporary file from a user device to a service provider device. The method further comprises, at operation 307 determining whether the download of the extracted firmware file is ended, at operation 308 continuing the download of the extracted firmware file, if determined at operation 307, that the download is not ended, and, at operation 309, producing a second temporary file at an instant that the download of the extracted firmware file is ended and transmitting the second temporary file from the user device to the service provider device. The method further comprises, at operation 310, determining whether the download of the extracted firmware file was successful, and, at operation 311, detecting a cause of a failure based on the second temporary file, if determined at operation 310 that the download was not successful. At operation 312, the problem that caused the failure is rectified.

The method of updating firmware according to an embodiment of the present invention will now be described in more detail with reference to FIGS. 2 and 3. Typically, the user device 201 accesses the service provider device 202 via the Internet 200 to upgrade firmware for a product, such as an optical disc drive product. The service provider device 202 receives a firmware file from the web server 203 and transmits the firmware file to the user device 201. The web server 203 provides the service provider device 202 with the firmware file as requested by the service provider device 202.

Accordingly in FIG. 3, at operation 301, typically, a customer visits a web site that provides firmware download services by accessing the service provider device 202 using the user device 201 via the Internet 200. At operation 302, the customer visiting the web site, i.e. the user device 201 accessing the service provider device 202, finds information related to a product model for which the customer wishes to download firmware. After finding the related information, at operation 303, the customer requests download of a firmware file for upgrading the corresponding desired product model. In response to the customer's request, at operation 304, the firmware file to be downloaded is opened and is extracted from a compressed format, and then, at operation 305, download of the firmware file from the service provider device 202 into the user device 201 is started.

At the instant that the download of the firmware file is started, at operation 306, the user device 201 produces a first temporary file, e.g., SFDNWIN.TMP, and transmits the first temporary file to the service provider device 202. The purpose of the first temporary file produced by the user device 201 is to indicate (i.e., acknowledge) to the service provider device 202 the start of the download, and the service provider device 202 detects (i.e., can confirm) the start of the download of the firmware file by receiving the first temporary file. Typically, after a predetermined time passes, the service provider device 202 deletes the first temporary file.

At operation 307, the service provider device 202 determines whether the download of the firmware file is ended, and if the download is not ended, at operation 308, continues the download. When the download of the firmware file is ended (i.e., completed, paused, prematurely terminated/an end, etc.), at operation 309, the user device 201 produces a second temporary file and transmits the second temporary file to the service provider device 202. The purpose of the second temporary file produced by the user device 201 is to indicate (i.e., acknowledge) to service provider device 202 success or failure of the download, and the service provider device 202 detects the success or the failure of the download of the firmware file by receiving the second temporary file.

In particular, at operation 310, the service provider device 202 inspects the received second temporary file and determines whether the download of the firmware file was successful, and if, at operation 310, the download was not successful, at operation 311, detects a cause of the failure based on the second temporary file. If, at operation 311, the cause of the failure is detected, at operation 312, a predetermined solution to whatever problem is determined to be the cause is provided to the user device 201.

The cause of a failure in downloading, which is detected by the service provider device 202 by inspecting the second temporary file, may be, for example, any one of the following failure types. A first type of failure may be related to a download instruction. That is, the failure is caused when the user device 201 does not/cannot normally process the download instruction. Typically, the first failure is defined as FAIL 0. When FAIL 0 is detected in the second temporary file received from the user device 201, typically the service provider device 202 provides the user device 201 with a predetermined solution to FAIL 0, so that the user device 201 can normally process the download instruction.

A second type of failure may be caused while preparing for the download. That is, the failure is caused when a problem occurs during data transmission via the Internet 200 in preparation for the download. Typically, the second failure is defined as FAIL 1. When FAIL 1 is detected in the second temporary file received from the user device 201, the service provider device 202 re-transmits the data via the Internet 200.

A third type of failure may be caused during the course of performing the download but the service provider device 202 can still normally process a request/communication, such as the second temporary file, from the user device 201 (i.e., the service provider device 202 is still in normal communication with the user device 201). For example, the third type of failure is caused when a problem occurs, such as a file error, after the service provider 202 has normally processed a typical communication protocol request from the user device 201, such as cease, pause, etc. Typically, the third failure is defined as FAIL 2. When FAIL 2 is detected in the second temporary file received from the user device 201, the service provider device 202 retransmits the data subject to the FAIL 2 failure via the Internet 200.

A fourth type of failure may also be caused during the course of the download. However, the fourth failure is not related to a normal request from the user device 201, e.g., to cease or pause the download, but to an abnormality, such as stoppage of the system itself or disconnection to the Internet due to an accidental interruption of electric power or an unknown malfunction. Typically, the fourth failure is defined as FAIL 3. Since the second temporary file itself cannot be transmitted, the service provider device 202 may detect FAIL 3 when there is no response from the user device 201 for a predetermined time-out period, e.g., two minutes.

As described above, according to the present invention, a cause of a problem during download of the firmware file can be detected and an adequate service for rectifying the problem can be quickly provided using temporary files produced when the download of the firmware file is started and ended. Therefore, it is possible to evaluate the cause of a download problem and provide an adequate and quick service to solve the problem with reduced cost. For example, the service provider device 202 can both rectify the download problem based upon the received temporary files as well as inform the user of the cause of the download problem based upon the received temporary files.

Advantageously, the transmitted temporary files by the user device 201 provide elevated download/communication errors at the application level, allowing the service provider device 202 to provide an improved detection of a download failure cause, and diagnosis of the download failure, over conventional lower level communication protocol error handling. For example, diagnosing (rectifying) a cause of a download failure by the server device can comprise providing a predetermined solution for the cause of the failure to the user device. Further, advantageously, by elevating causes of the download failures to the application level, the user also can possibly help rectify or rectify the download problem, for example, in the case of the FAIL 0 download failure type by providing a solution at the user device 201. Although the above example embodiment describes downloading a firmware file in connection with updating a product, such as an optical disk drive, the present invention is not limited to such a configuration, and the present invention can be used in connection with downloading any network file, including any product update files. Further, although in the above example embodiment, the second temporary file is generated by the user device 201 and transmitted to the service provider device 202 upon an end in the downloading, the present invention is not limited to such a configuration and temporary download error files can be generated and transmitted by the user device 201 at any stage of the downloading to support/improve download failure diagnosis (i.e., detection of a cause of the failure and correction). The processes of the invention as shown in FIG. 3 are provided in a user computing device and in a service provider computing device in network communication with each other, and the processes are implemented therein using software and/or computing hardware.

Although a few embodiments of the present invention have been shown and described, it will be understood by those of ordinary skill in the art that various changes in form and details may be made therein without departing from the spirit and scope of the present invention as defined by the appended claims and their equivalents.

What is claimed is:

1. A method of updating firmware in a system including a user device, a service provider device providing a firmware file to the user device through a communication network, and a web server providing the firmware file to the service provider device, the method comprising:
   starting provision of the firmware file to the user device and receiving from the user device a first temporary file indicating a start of downloading of the firmware file;
   generating in the user device a second temporary file upon an end in the downloading and receiving from the user device the second temporary file; and
   determining whether the download of the firmware file is started and whether the download was a success or a failure by inspecting the received first and second temporary files, and if determined that the download failed, rectifying a problem that caused the failure of the download based upon the received second temporary file.

2. The method of updating firmware according to claim 1, further comprising deleting the first and the second temporary files after a predetermined time.

3. The method of claim 1, wherein the second temporary file defines the problem that caused the failure according to a type of download failure.

4. The method of claim 1, wherein the second temporary file defines a download instruction error as the problem that caused the failure.

5. The method of claim 1, wherein the second temporary file defines a download preparation error as the problem that caused the failure.

6. The method of claim 1, wherein the second temporary file defines a downloaded file error as the problem that caused the failure.

7. The method of claim 1, wherein the rectifying of the problem comprises providing a predetermined solution to the problem to the user device.

8. A system, comprising:
   a user device comprising a programmed computer processor requesting downloading of an update file over a network, and generating temporary error files during the downloading; and
   a server device in communication with the user device via the network and comprising a programmed computer processor starting the downloading of the requested firmware file to the user device, receiving from the user device the temporary error files indicating a start or an end in the downloading, and diagnosing a failure in the downloading based upon the received temporary error files.

9. The system of claim 8, wherein the diagnosing of the failure by the server device comprises providing a predetermined solution for a cause of the failure to the user device.

10. A method of updating firmware in a system using a user device communicating with a service provider device, comprising:
    providing a firmware file to be downloaded to a user device;
    receiving a first temporary file from the user device indicating that downloading of the firmware file has started;
    receiving a second temporary file from the user device that was generated in the user device indicating that downloading of the firmware file has ended; and
    inspecting the first and second temporary files to determine whether downloading at the user device has begun and whether the download was a success or failure.

11. The method of updating firmware according to claim 10, wherein upon making a determination that the download failed, detecting a cause of the failure based on the second temporary file.

12. The method of updating firmware according to claim 11, further comprising providing a predetermined solution to the user device based on the cause of the failure determined.

13. A method of updating firmware in a system including a user device, a service provider device providing a firmware file to the user device through a communication network, and a web server providing the firmware file to the service provider device, the method comprising:
    requesting downloading of the firmware file;
    generating a first temporary file indicating a start of downloading of the firmware file;
    generating a second temporary file upon an end in the downloading; and
    transmitting the first and second generated temporary files such that a determination may be made, based on the first and second generated temporary files, as to whether the download was a success or a failure at the device that generated the first and second temporary files.

14. A user device, comprising:
    a computer processor requesting downloading of a firmware file to the user device, generating a first temporary file indicating a start of downloading of the firmware file, generating a second temporary file upon an end in the downloading of the firmware file, and transmitting the first and second generated temporary files such that a determination may be made, based on the first and second generated temporary files, as to whether the download was a success or a failure at the user device.

* * * * *